United States Patent [19]

Joyner et al.

[11] Patent Number: 4,483,969

[45] Date of Patent: Nov. 20, 1984

[54] EMULSIFIABLE POLYESTER WAXES

[75] Inventors: Frederick B. Joyner; Jimmy R. Trotter; Richard L. McConnell, all of Kingsport, Tenn.

[73] Assignee: Eastman Kodak Company, Rochester, N.Y.

[21] Appl. No.: 509,551

[22] Filed: Jun. 30, 1983

[51] Int. Cl.$^3$ .............................................. C08G 63/76
[52] U.S. Cl. .................... 525/437; 260/410.6; 528/272; 528/295; 528/296; 560/11; 560/84; 560/90; 560/193; 560/198
[58] Field of Search .................... 528/272, 295–296; 560/11, 84, 193, 198, 90; 260/410.6; 525/437

[56] References Cited

U.S. PATENT DOCUMENTS

| | | | |
|---|---|---|---|
| 3,076,787 | 2/1963 | Johnson et al. | 560/90 X |
| 3,249,615 | 5/1966 | Ackermann | 528/302 X |
| 3,590,076 | 6/1971 | Heintzelman et al. | 560/198 |
| 3,699,154 | 10/1972 | Heintzelman et al. | 560/193 X |
| 3,704,255 | 11/1972 | Braun | 528/302 X |
| 4,039,560 | 8/1977 | Tomoshige | 560/198 X |

Primary Examiner—Lucille M. Phynes
Attorney, Agent, or Firm—Clyde L. Tootle; Daniel B. Reece, III

[57] ABSTRACT

This invention relates to new emulsifiable polyester waxes which are linear polyester waxes which are end capped with polyfunctional organic anhydrides. The emulsifiable polyester waxes are generally amorphous or semicrystalline solids with melting points less than about 100° C. These polyester waxes are useful in preparing clear emulsions which can be applied to surfaces to form protective and decorative films or coatings.

15 Claims, No Drawings

EMULSIFIABLE POLYESTER WAXES

DESCRIPTION

This invention relates to new emulsifiable polyester waxes which are linear polyester waxes end capped with polyfunctional organic anhydrides. The emulsifiable polyester waxes are generally amorphous or semicrystalline solids with melting points less than about 100° C. These polyester waxes are useful in preparing emulsions which can be applied to surfaces to form protective films or coatings and also can be used in formulating adhesives.

Heretofore, synthetic emulsifiable waxes were the polyolefin waxes such as the oxidized polyethylene waxes, both high and low density, and chemically modified polyethylene waxes and polypropylene waxes. Also, various ethylene telomer waxes and ethylene/acrylic acid copolymer waxes have been used in preparing emulsifiable waxes. These emulsifiable synthetic waxes are used in preparing anionic, cationic or nonionic emulsions. These emulsions are then useful in floor polishes, for textile treatment and finishes, for fruit coatings and the like. These waxes have particular properties unique to the polymer from which the emulsion is prepared. For example, low density polyethylene and ethylene telomer waxes form coatings which are not tough. However, the polypropylene and ethylene/acrylic waxes have good toughness. However, should a coating be desired which has the properties of two or more waxes, the emulsifiable polyolefins cannot be used in such blends as the polyolefin waxes are generally incompatible with each other. Therefore, it would be an advance in the state of the art to prepare emulsifiable polyester waxes. Also, since such polyester waxes are compatible with emulsifiable polyolefin waxes and form blends which can be formed into emulsions which form coatings and films having properties common to the polymers from which the emulsion is prepared would also be a significant advance in the state of the art.

According to the present invention, it has now been found that new and useful emulsifiable polyester waxes with narrow molecular weight distributions and with melting points up to about 100° C. can readily be prepared. It is also possible to vary the molecular weight of these waxes and to provide waxes with different rheological characteristics. Thus, polymers with wax-like properties can be prepared which have inherent viscosities in the range from about 0.05 to about 0.39, a melt viscosity of about 10 to about 2000, preferably about 20 to 1000, most preferably about 25 to 750 cp. at 190° C., and a heat of fusion of less than 28 cal./g. These new emulsifiable waxes are useful in forming emulsions either alone or blended with emulsifiable polyolefin waxes.

These new polyester waxes may be amorphous or semicrystalline solids with crystalline melting points ranging up to about 100° C. These new emulsifiable polyester waxes are prepared in a two-stabged reaction in which a linear polyester is first prepared from at least one saturated aliphatic or cycloaliphatic dibasic acid having 4 to 36 carbon atoms and at least one saturated aliphatic or cycloaliphatic glycol having 2 to 12 carbon atoms. This polyester wax is then subsequently reacted with a polyfunctional organic anhydride. Useful polyfunctional anhydrides include trimellitic anhydride, sulfobenzoic anhydride, phthalic anhydride, and the like.

Suitable saturated aliphatic or cycloaliphatic dibasic acids include cis or trans 1,4-cyclohexanedicarboxylic, cis or trans 1,3-cyclohexanedicarboxylic, glutaric, adipic, pimelic, suberic, azelaic, sebacic, 1,12-dodecanedioic, dimer acid, and the like. Alkylated succinic anhydrides such as octylsuccinic, tetradecylsuccinic, octadecylsuccinic anhydride, and the like may also be used as a portion of the dibasic acid moiety. Suitable aliphatic or cycloaliphatic glycols are, for example, ethylene glycol, 1,3-propanediol, propylene glycol, 1,4-butanediol, 1,5-pentanediol, 1,6-hexanediol, 1,8-octanediol, 1,4-cyclohexanedimethanol, 1,3-cyclohexanedimethanol, 2,2-dimethyl-1,3-propanediol, 2,2,4,4-tetramethyl-1,3-cyclobutanediol, diethylene glycol, poly(oxyethylene)glycol, and the like.

These end capped, functionalized polyester waxes are readily emulsified with conventional emulsification systems. They may also be coemulsified with oxidized polyethylene or ethylene telomer waxes or with low molecular weight ethylene/acrylic acid copolymer waxes. Such emulsions are useful in floor polishes, for textile treatment and for fruit coating purposes. The functional groups also provide sites for further reaction. For example, the waxes may be crosslinked through reaction with Cymel resins, diisocyanates, and the like.

These new polyester and copolyester waxes are readily prepared using typical polycondensation reaction conditions. They may be prepared either by batch or continuous processes based on esterification or transesterification reactions.

Typical polyesterification catalysts which may be used include titanium alkoxides, dibutyltin dilaurate, and combinations of zinc, manganese, or magnesium acetates or benzoates with antimony oxides or antimony triacetate.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 115 grams (0.5 moles) of 1,12-dodecanedioic acid, 62.0 grams (1.0 mole) of ethylene glycol, and 100 ppm of titanium catalyst (titanium isopropoxide in n-butanol) are weighed into a 500-mL single-neck round-bottom flask equipped with a nitrogen inlet, a stirrer, a vacuum outlet, and a condensing flask. The flask is heated to 200° C. in a Belmont metal bath for one hour with a nitrogen sweep over the reaction mixture. The metal bath temperature is then increased to 210° C. for one hour. When the theoretical amount of water has distilled from the reaction mixture, the metal bath temperature is increased to 250° C. and the pressure in the flask is reduced to about 0.1 mm of mercury. The flask is heated at 250° C. at reduced pressure for 8 minutes. With the reaction mixture under a nitrogen atmosphere, the metal bath temperature is lowered to 225° C. To the molten polymer, 4.61 grams (0.024 mole) of trimellitic anhydride is added. The reaction mixture is then heated with stirring at 225° C. for 15 minutes allowing the trimellitic anhydride to react with the preformed polymer wax. After 15 minutes the flask is removed from the metal bath and is allowed to cool under a nitrogen atmosphere as the polymer wax solidifies. A nuclear magnetic resonance (NMR) analysis indicates that the polyester wax is a poly(ethylene dodecanedioate) containing 7.4 mole percent trimellitic anhydride.

The modified poly(ethylene dodecanedioate) polyester wax is an opaque, white color. The polymer has a number average molecular weight ($M_n$) of 3968, a Thermosel melt viscosity of 263 cp. at 190° C., and a penetration hardness value of <1 (by ASTM D5 method). By DSC analysis, the polymer has a melting point ($T_m$) of 86° C. [heat of fusion ($\Delta H_f$) value of 22.1 cal./g.]. The modified polyester wax has a hydroxyl number of 20.5 and an acid number of 19.4.

Emulsions are made according to the following general procedure. A mixture of 20 grams of the end capped polyester wax and 4.5 grams of tall oil fatty acid are melted and heated to about 110° C. Diethylaminoethanol (5.5 grams) is added to this molten blend and the melt is gradually added to 70 mL of water (previously heated to 95°-100° C.) while the hot water is stirred with a mechanical stirrer. Stirring is continued until the water clear, amber-colored emulsion has cooled to ambient temperature. A film cast from this emulsion is smooth, hard, and glossy. Similarly good results are achieved when a 50/50 blend of the end capped polyester wax and Epolene E-10 emulsifiable polyethylene wax (acid No. 15; Brookfield Thermosel melt viscosity 900 cp. at 125° C.) are emulsified by the above procedure.

EXAMPLE 2

The procedure of Example 1 is repeated except that 9.22 grams (0.048 mole) of trimellitic anhydride is allowed to react with the preformed poly(ethylene dodecanedioate) polymer. NMR analysis indicates that the resulting polymer is a poly(ethylene dodecanedioate) containing 10.8 mol percent trimellitic anhydride. The polymer has an acid number of 41.4 and a hydroxyl number of 13.2.

The polymer is an opaque, white color. It has a molecular weight ($M_n$) of 3744, a Thermosel melt viscosity of 200 cp. at 190° C., and a penetration hardness value of <1 (by ASTM D5 method). By DSC analysis, the polymer has a melting point ($T_m$) of 86° C. and heat of fusion ($\Delta H_f$) of 20.6 cal./g.

EXAMPLE 3

The procedure of Example 1 is repeated except that 18.43 grams (0.096 mole) of trimellitic anhydride is allowed to react with the preformed polymer. NMR analysis indicates that the resulting polymer is a poly(ethylene dodecanedioate) containing 11.7 mol percent trimellitic anhydride. The polymer has an acid number of 75.2 and a hydroxyl number of 2.1.

The polymer is an opaque, white color. It has a molecular weight ($M_n$) of 2558, a Thermosel melt viscosity of 88 cp. at 190° C., and a penetration hardness value of <1 (by ASTM D5 method). By DSC analysis, the polymer has a melting point ($T_m$) of 78° C. and heat of fusion ($\Delta H_f$) of 20.3 cal./g.

EXAMPLE 4

The procedure of Example 1 is repeated except that 4.42 grams (0.024 mole) of sulfobenzoic anhydride is allowed to react with the preformed polymer. NMR analysis indictes that the resulting polymer is a poly(ethylene dodecanedioate) containing 3 mol percent sulfobenzoic anhydride. The polymer has an acid number of 20.1 and a hydroxyl number of 43.8.

The polymer is an opaque, white color. It has a molecular weight ($M_n$) of 2308, a Thermosel melt viscosity of 38 cp. at 190° C., and a penetration hardness value of <1 (by ASTM D5 method). By DSC analysis the polymer has a melting point ($T_m$) of 85° C. and heat of fusion ($\Delta H_f$) of 25.3 cal./g.

EXAMPLE 5

The procedure of Example 1 is repeated except that 8.83 grams (0.048 mole) of sulfobenzoic anhydride is allowed to react with the preformed polymer. NMR analysis indicates that the resulting polymer is a poly(ethylene dodecanedioate) containing 5.9 mol percent sulfobenzoic anhydride. The polymer has an acid number of 41.3 and a hydroxyl number of 49.4.

The polymer is an opaque, white color. It has a molecular weight ($M_n$) of 2025, a Thermosel melt viscosity of 25 cp. at 190° C., and a penetration hardness value of <1 (by ASTM D5 method). By DSC analysis the polymer has a melting point ($T_m$) of 81° C. and heat of fusion ($\Delta H_f$) of 26.7 cal./g.

EXAMPLE 6

The procedure of Example 1 is repeated except that 80.5 grams (0.35 mole) of 1,12-dodecanedioic acid, 52.8 grams (0.15 mole) of octadecylsuccinic anhydride, and 62 grams (1.0 mole) of ethylene glycol are used to prepare a poly(ethylene 1,12-dodecanedioate) copolyester containing 30 mol percent of octadecylsuccinic anhydride moiety. The preformed polymer is then reacted with 4.61 grams (0.024 mole) of trimellitic anhydride. The resulting polymer contains 6.5 mol percent of the trimellitic anhydride moiety. The polymer has a melting point of 61° C., a heat of fusion ($\Delta H_f$) of 12 cal./g., a Thermosel melt viscosity of 640 cp. at 190° C., and an acid number of 25.

EXAMPLE 7

A melt blend is made at 175° C. in a glass flask using 35 grams of Elvax 220 copolymer (ethylene/vinyl acetate copolymer containing 28 weight percent vinyl acetate; melt index 150), 30 grams of Foral 105 rosin ester tackifying resin (ring and ball softening point 105° C.), 25 grams of 150° F. microcrystalline wax, and 10 grams of the end capped emulsifiable polyester wax prepared according to Example 1. A ⅜-inch molten bead of this blend is applied at 175° C. to a piece of corrugated board and this piece of corrugated board is quickly laminated to another piece of corrugated board. A fiber tearing bond is obtained with this adhesive mixture in about two seconds compression time.

This example shows the compatibility of the end capped emulsifiable polyester waxes in blends with various polyolefin, synthetic hydrocarbon and naturally occurring resins and rosins.

Therefore, not only do the emulsifiable polyester waxes of this invention provide emulsions which form polishing and coating compositions but they can be blended with emulsifiable polyolefins to provide polishing and coating compositions for coating a variety of substrates such as kraft paper, milk carton stock, photographic papers, cellulosic sheets, primed metal foils such as aluminum and the like with a variety of coatings. These compatible polyester waxes can also be blended with polyolefins, synthetic hydrocarbons and resins to form adhesives which find utility in food packaging, drug and medicine packing and other well known uses.

The invention has been described in detail with particular reference to preferred embodiments thereof, but it will be understood that variations and modifications can be effected within the spirit and scope of the invention.

We claim:

1. A linear amorphous or semicrystalline emulsifiable polyester wax having an inherent viscosity of about 0.05 to about 0.39, a melt viscosity of about 10 to about 2000, cp. at 190° C. a heat of fusion of less than 28 cal./g., and a melting point less than about 100° C. prepared by reacting at least one saturated aliphatic or cycloaliphatic dibasic acid having 4 to 36 carbon atoms with at least one saturated aliphatic or cycloaliphatic glycol having 2 to 12 carbon atoms to form a substantially hydroxy-terminated nonemulsifiable linear polyester wax and subsequently reacting said polyester wax with a polyfunctional organic anhydride.

2. A linear emulsifiable polyester wax according to claim 1 wherein said saturated aliphatic or cycloaliphatic dibasic acid is 1,12-dodecanedioic acid.

3. A linear emulsifiable polyester wax according to claim 2 wherein said saturated aliphatic or cycloaliphatic glycol is ethylene glycol.

4. A linear emulsifiable polyester wax according to claim 3 wherein said polyfunctional organic anhydride is trimellitic anhydride.

5. A linear emulsifiable polyester wax according to claim 3 wherein said polyfunctional organic anhydride is sulfobenzoic anhydride.

6. A linear amorphous or semicrystalline emulsifiable polyester wax having an inherent viscosity of about 0.05 to about 0.39, a melt viscosity of about 20 to about 1000, cp. at 190° C. a heat of fusion of less than 28 cal./g., and a melting point less than about 100° C. prepared by reacting at least one saturated aliphatic or cycloaliphatic dibasic acid having 4 to 36 carbon atoms with at least one saturated aliphatic or cycloaliphatic glycol having 2 to 12 carbon atoms to form a substantially hydroxy-terminated nonemulsifiable linear polyester wax and subsequently reacting said polyester wax with a polyfunctional organic anhydride.

7. A linear emulsifiable polyester wax according to claim 6 wherein said saturated aliphatic or cycloaliphatic dibasic acid is 1,12-dodecanedioic acid.

8. A linear emulsifiable polyester wax according to claim 7 wherein said staurated aliphatic or cycloaliphatic glycol is ethylene glycol.

9. A linear emulsifiable polyester wax according to claim 8 wherein said polyfunctional organic anhydride is trimellitic anhydride.

10. A linear emulsifiable polyester wax according to claim 8 wherein said polyfunctional organic anhydride is sulfobenzoic anhydride.

11. A linear amorphous or semicrystalline emulsifiable polyester wax having an inherent viscosity of about 0.05 to about 0.39, a melt viscosity of about 25 to about 750, cp. 190° C. a heat of fusion of less than 28 cal./g., and a melting point less than about 100° C. prepared by reacting at least one saturated aliphatic or cycloaliphatic dibasic acid having 4 to 36 carbon atoms with at least one saturated aliphatic or cycloaliphatic glycol having 2 to 12 carbon atoms to form a substantially hydroxy-terminated nonemulsifiable linear polyester wax and subsequently reacting said polyester wax with a polyfunctional organic anhydride.

12. A linear emulsifiable polyester wax according to claim 11 wherein said saturated aliphatic or cycloaliphatic dibasic acid is 1,12-dodecanedioic acid.

13. A linear emulsifiable polyester wax according to claim 12 wherein said saturated aliphatic or cycloaliphatic glycol is ethylene glycol.

14. A linear emulsifiable polyester wax according to claim 13 wherein said polyfunctional organic anhydride is trimellitic anhydride.

15. A linear emulsifiable polyester wax according to claim 13 wherein said polyfunctional organic anhydride is sulfobenzoic anhydride.

* * * * *